United States Patent [19]

Grossman et al.

[11] Patent Number: 5,064,980

[45] Date of Patent: * Nov. 12, 1991

[54] COFFEE MAKER

[75] Inventors: M. Gary Grossman, Riverside, Conn.; Edward H. Meisner, Short Hills, N.J.

[73] Assignee: GEE Associates, Edgewater, N.J.

[*] Notice: The portion of the term of this patent subsequent to Apr. 23, 2008 has been disclaimed.

[21] Appl. No.: 535,725

[22] Filed: Jun. 11, 1990

[51] Int. Cl.⁵ .............................................. H05B 6/80
[52] U.S. Cl. ...................... 219/10.55 E; 219/10.55 R; 99/306; 99/300; 99/DIG. 14; 426/241
[58] Field of Search ................ 219/10.55 R, 10.55 E; 99/306, 305, 300, 451, DIG. 14; 426/241, 243

[56] References Cited

U.S. PATENT DOCUMENTS

| | | |
|---|---|---|
| 2,000,309 | 5/1935 | Wentorf . |
| 2,292,101 | 8/1942 | Brown . |
| 2,292,853 | 8/1942 | Wilcox . |
| 2,560,523 | 7/1951 | Efford . |
| 2,601,067 | 6/1952 | Spencer . |
| 2,615,384 | 10/1952 | Ranz . |
| 2,743,664 | 5/1956 | Dale . |
| 3,063,359 | 11/1962 | Brant . |
| 3,083,101 | 3/1963 | Noury . |
| 3,094,917 | 6/1963 | Rombouts . |
| 3,293,048 | 12/1966 | Kitterman . |
| 3,333,527 | 8/1967 | Bender . |
| 3,336,142 | 8/1967 | Lawson . |
| 3,391,632 | 7/1968 | Colonna . |
| 3,410,697 | 11/1968 | Stephenson . |
| 3,442,199 | 5/1969 | McGrail . |
| 3,465,873 | 9/1969 | Munz . |
| 3,587,444 | 6/1971 | Godel . |
| 3,589,272 | 6/1971 | Bouladoa . |
| 3,672,916 | 6/1972 | Virnig . |
| 3,694,235 | 9/1972 | Siegel . |
| 3,695,168 | 10/1972 | Van Brunt . |
| 3,743,520 | 7/1973 | Croner . |
| 3,796,813 | 3/1974 | Kurland . |
| 3,868,218 | 2/1975 | Tornmarck et al. . |
| 3,985,069 | 10/1976 | Cavalluzzi . |
| 4,006,820 | 2/1977 | Smith . |
| 4,023,164 | 5/1977 | Delaney . |
| 4,104,957 | 8/1978 | Freedman et al. ........... 219/10.55 E |
| 4,132,239 | 1/1979 | Bowen et al. . |
| 4,136,202 | 1/1979 | Favre . |
| 4,166,208 | 8/1979 | Martel et al. . |
| 4,167,136 | 9/1979 | Chupurdy . |
| 4,167,899 | 9/1979 | Mc Cormick . |
| 4,190,077 | 2/1980 | Bowen et al. . |
| 4,207,725 | 6/1980 | Smith . |
| 4,210,674 | 7/1980 | Mitchell . |
| 4,226,330 | 10/1980 | Butler . |

(List continued on next page.)

FOREIGN PATENT DOCUMENTS 177281A  4/1986  European Pat. Off. .
0320679  6/1989  European Pat. Off. .

OTHER PUBLICATIONS

G. B. Raffetto Ads "Coffee in a Filter" and Cafe Filtre.

Primary Examiner—Philip H. Leung
Attorney, Agent, or Firm—Hedman, Gibson, Costigan & Hoare

[57] ABSTRACT

A drip-type coffee maker adapted for use in a microwave oven. The coffee maker includes a container which can dispense coffee directly into a receptacle therebelow and has an upper reservoir for holding water, a lower filter element for holding coffee grounds and a partition, which separates the reservoir and coffee filter element. The partition includes a portion thereof adapted to close and open communication between the reservoir and the filter element, and a non-toxic heat responsive sealing substance adapted to releasably seal the partition portion in the closed position until water in the reservoir reaches a temperature for brewing coffee. When the water in the reservoir reaches a desired brewing temperature, the heat responsive seal releases the portion by melting, dissolving or the like, opening the reservoir to the filter element to the flow of the heated water into and through the filter element and coffee grounds to produce freshly brewed coffee which can be directly dispensed into a receptacle therebelow.

29 Claims, 13 Drawing Sheets

U.S. PATENT DOCUMENTS

| | | |
|---|---|---|
| 4,233,325 | 11/1980 | Slangan et al. . |
| 4,303,196 | 12/1981 | Raines et al. . |
| 4,306,492 | 12/1981 | Zimmermann . |
| 4,345,512 | 8/1982 | Moore . |
| 4,348,421 | 9/1982 | Sakakibara et al. . |
| 4,381,696 | 5/1983 | Koral ................................. 99/306 |
| 4,386,109 | 5/1983 | Bowen et al. ................ 219/10.55 E |
| 4,404,241 | 9/1983 | Mueller et al. . |
| 4,417,504 | 11/1983 | Yamamoto . |
| 4,446,158 | 5/1984 | English et al. . |
| 4,471,689 | 9/1984 | Piana . |
| 4,518,082 | 5/1985 | Ye . |
| 4,550,024 | 10/1985 | le Granse . |
| 4,577,080 | 3/1986 | Grossman ..................... 219/10.55 E |
| 4,596,713 | 6/1986 | Burdette . |
| 4,627,334 | 12/1986 | Shanklin . |
| 4,642,443 | 2/1987 | Jorgensen et al. ........... 219/10.55 E |
| 4,697,502 | 10/1987 | English et al. . |
| 4,697,503 | 10/1987 | Okabe et al. . |
| 4,720,410 | 1/1988 | Lundquist et al. . |
| 4,721,835 | 1/1988 | Welker . |
| 4,756,915 | 7/1988 | Dobry . |
| 4,806,371 | 2/1989 | Mendenhall . |

FIG.1
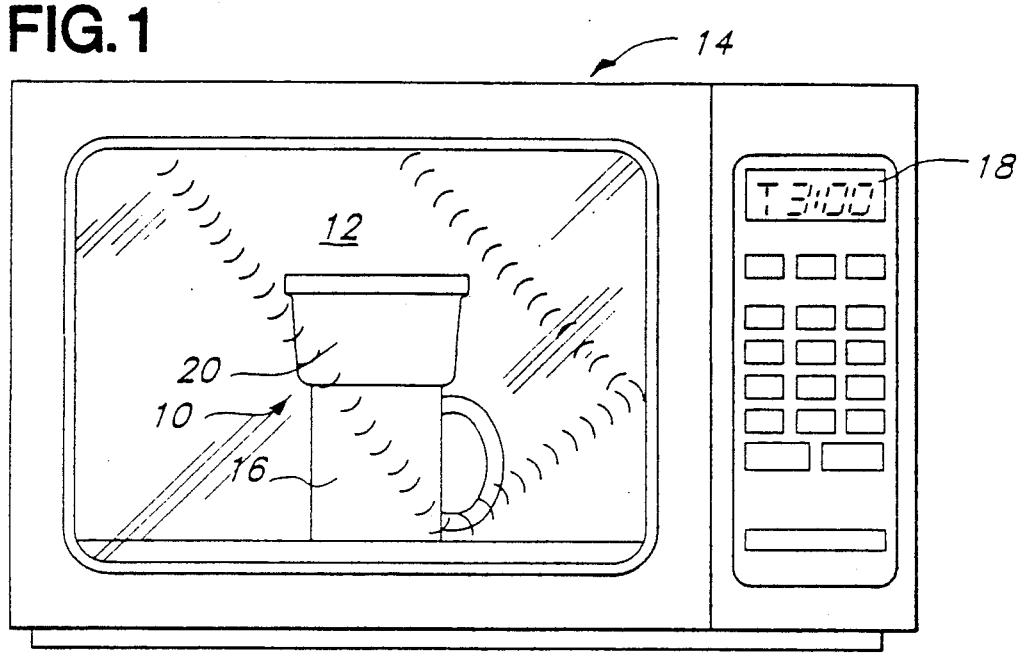
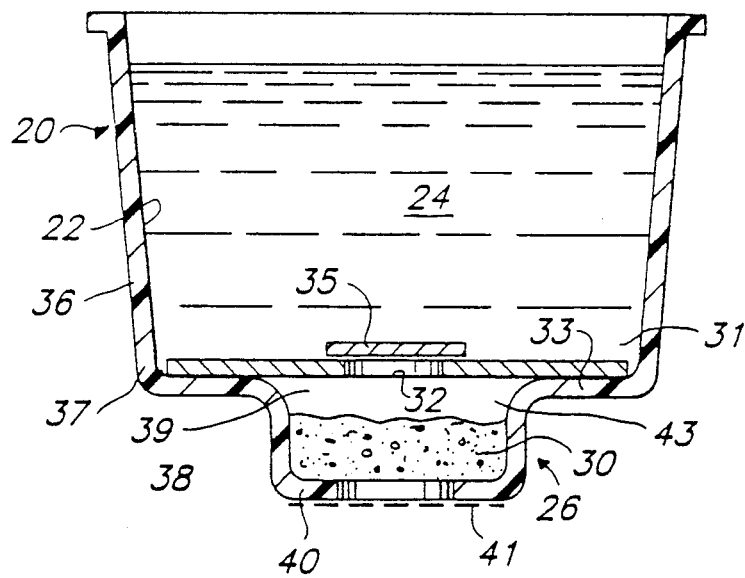
FIG.2
FIG.3
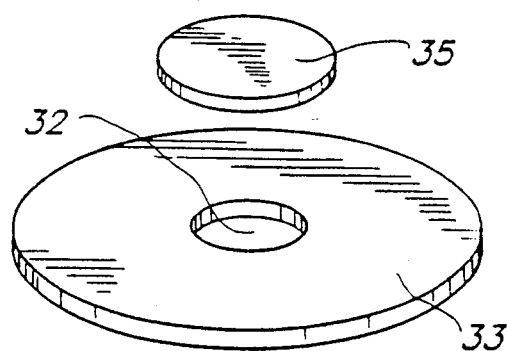

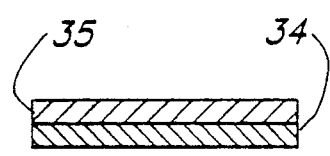
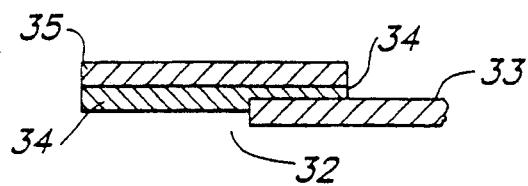
FIG.5A  FIG.5B
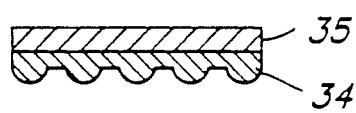
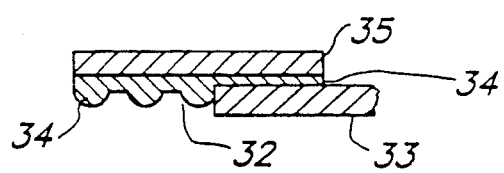
FIG.6A  FIG.6B
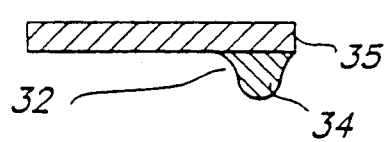
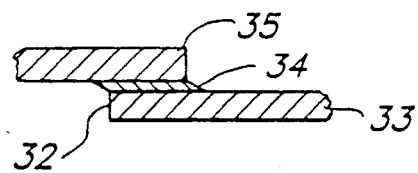
FIG.7A  FIG.7B
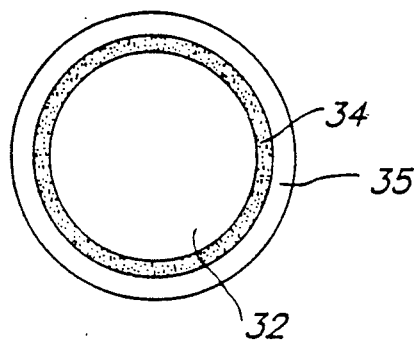
FIG.7C

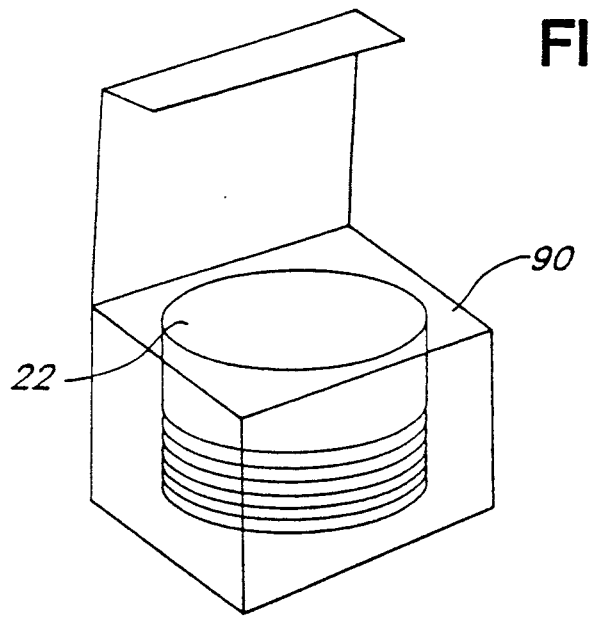
FIG.22
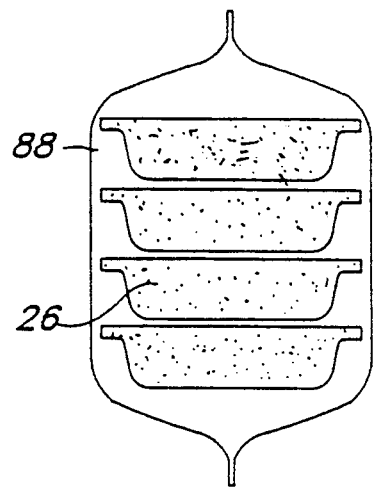
FIG.23
FIG.24
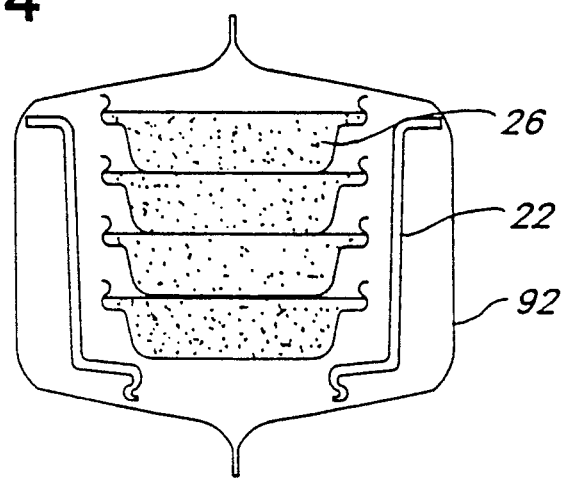

COFFEE MAKER

FIELD OF THE INVENTION

This invention is directed to a convenient, time saving coffee maker adapted for use in a microwave device. This invention also relates to a relatively inexpensive, simple, disposable, drip-type, microwave coffee maker adapted to dispense freshly brewed coffee directly into a cup, mug or the like.

BACKGROUND OF THE INVENTION

U.S. Pat. No. 4,577,080 of assignee discloses a coffee maker which is well suited for use in a microwave oven. The coffee maker of the patent includes a container having a reservoir for water, a filter element for coffee and a partition between the reservoir and filter element having at least one perforation or aperture therein adapted to be sealed or closed by the use of a non-toxic heat responsive substance until the water reaches a brewing temperature. When the desired temperature is reached, the heat responsive substance causes the aperture to open and allows the heated water to flow therethrough into the filter element and coffee grounds to become freshly brewed coffee ready for dispensing.

The present invention relates to additional coffee makers which are well suited for use in microwave ovens.

SUMMARY OF THE INVENTION

The coffee makers of the present invention, which are well suited for brewing and dispensing coffee in a microwave oven, include a container having a reservoir for water, a coffee filter element for coffee grounds, and a heat responsive partition which separates the reservoir and coffee filter element until the water reaches a desired coffee brewing temperature. The partition includes at least a portion thereof adapted to close and open communication between the reservoir and the filter element, and a non-toxic heat responsive sealing substance adapted to releasably seal the partition portion in the closed position until water in the reservoir reaches a temperature for brewing coffee. When the heated water reaches a desired temperature, the heat responsive substance is adapted to release the partition portion and thereby open the reservoir to the filter element, whereupon the heated water will flow from the reservoir into the filter element and the coffee grounds to become freshly brewed coffee ready for dispensing from the coffee maker.

In a preferred embodiment of the invention, the partition includes a body having an aperture or opening therein, a member adapted to be positioned over the aperture and a non-toxic heat responsive seal between the partition body and member releasably securing the member to the body over the aperture for sealing the aperture until the water in the reservoir reaches a brewing temperature. In use, the seals loses its sealing properties (e.g. melts, dissolves or the like) when the water in the reservoir reaches a brewing or desired temperature, whereupon the member is released from the partition body and the aperture opens to the flow of heated water for brewing and dispensing in and from the filter element.

In the embodiment where the member is above the partition it is adapted to float upwardly from the partition, and in the embodiment where the member is under the partition it is adapted to drop from the partition.

In another preferred embodiment of the invention, the partition itself can be sealed in and to the container, such as the lower portion of the reservoir, by the non-toxic heat responsive seal of the invention. In such instance, the seal can releasably secure the partition to a wall or walls of the container (e.g. a bottom wall of the reservoir) until the seal releases the partition at a coffee brewing temperature.

Preferably, the seal of the present invention comprises a non-toxic substance which melts, dissolves or the like at the desired temperature.

With respect to the use of the coffee makers of the present invention in microwave ovens, preferably water is placed in the reservoir and the container is positioned over or on a cup, mug or other coffee receptacle and the assembly is placed in a microwave oven. When the water reaches a desired temperature (e.g. coffee brewing temperature) the non-toxic temperature responsive heat seal loses its sealing properties by melting, dissolving or the like and releases at least a portion of the partition to allow the heated water to commingle with the coffee grounds in the filter element to become freshly brewed coffee which can be dispensed directly into the receptacle therebelow.

BRIEF DESCRIPTION OF THE DRAWINGS AND DETAILED DESCRIPTION OF THE INVENTION

The following is a brief description of the drawings and a detailed description of illustrative embodiments of the invention. It is to be understood that the invention is capable of modification and variation apparent to those skilled in the art within the spirit and scope of the invention.

FIG. 1 is a front pictoral view of a microwave oven with a preferred embodiment of the coffee maker of the present invention therein;

FIG. 2 is a front elevational view, in section, of the coffee maker shown in FIG. 1;

FIG. 3 is an exploded view of the partition body and disk of the preferred embodiment of the invention illustration in FIG. 2;

Figure 4:
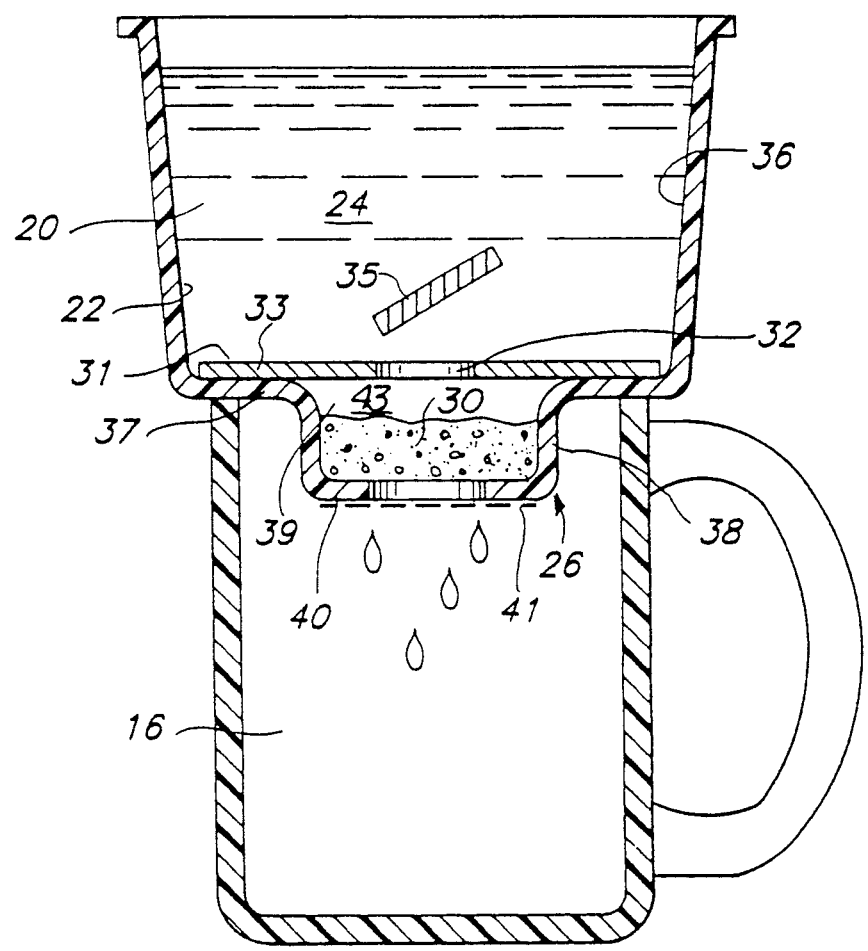

FIG. 4 is a front elevational view, in section, of the coffee maker of FIG. 2 resting on a coffee mug and illustrating the operation of the invention when the heated water reaches a brewing temperature; and FIGS. 5A and 5B are enlarged detail views, in section, illustration one embodiment of non-toxic heat responsive sealing substance of the invention on the disk (FIG. 5A) and of the disk releasably secured to the partition body for sealing the aperture (FIG. 5B).

Figure 8A:
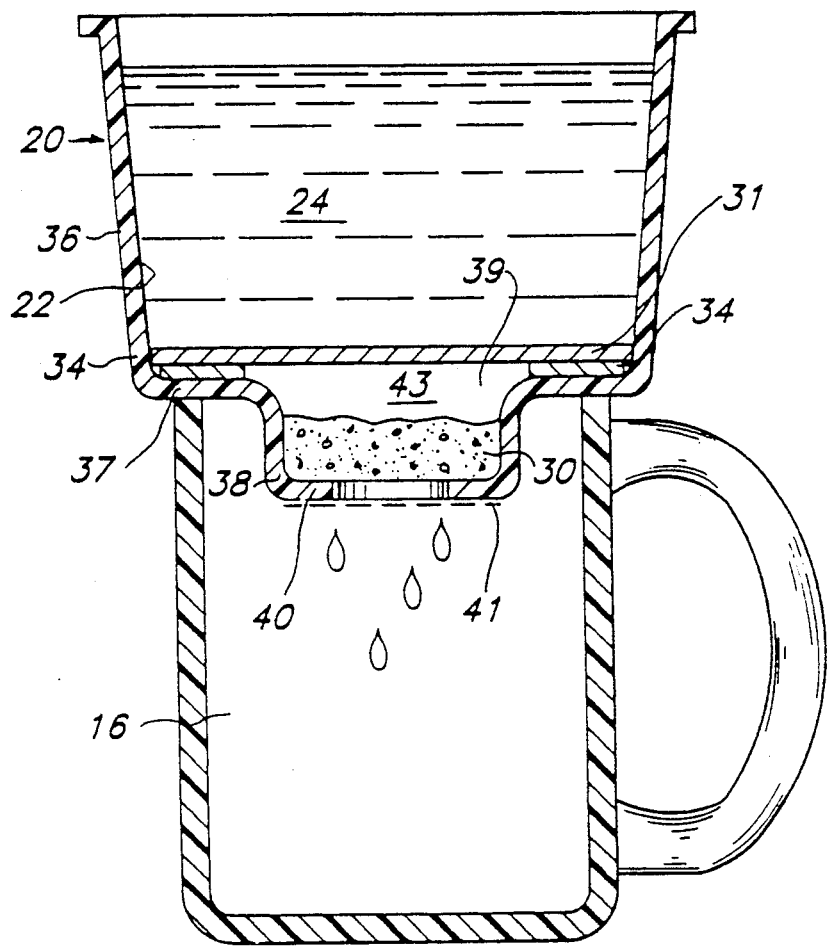

FIGS. 6A and 6B are similar to FIGS. 5A and 5B, and illustrate another embodiment of the non-toxic heat responsive substance of the invention on the disk (FIG. 6A) and of the disk releasably secured to the partition body (FIG. 6B);

FIGS. 7A and 7B are similar to FIGS. 5A and 5B, illustrating another embodiment of the non-toxic heat sealing substance of the invention and its use for sealing purposes, and FIG. 7C is a view of the bottom of the disk and seal of FIG. 7A;

FIG. 8A is a front elevational view, in section, of another embodiment of the coffee maker of the present invention, wherein the partition extends across the lower portion of the reservoir and is releasably secured to the reservoir by a non-toxic seal.

Figure 8B:
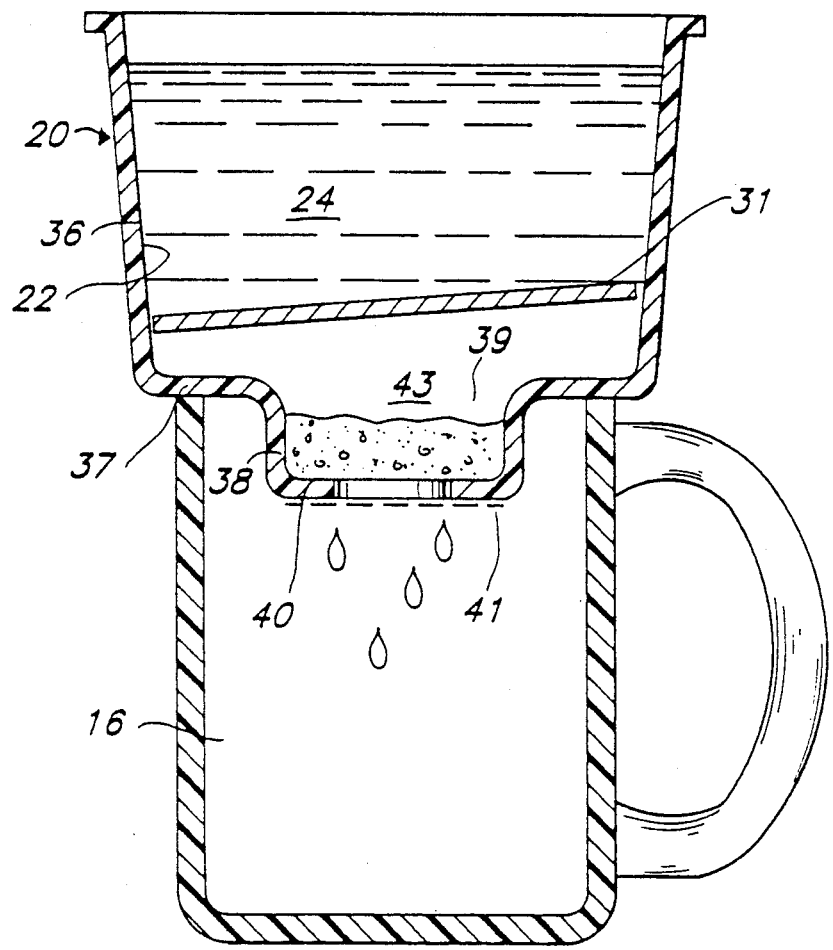

FIG. 8B is similar to FIG. 8A and illustrates the operation of the illustrated coffee maker.

Figure 9A:
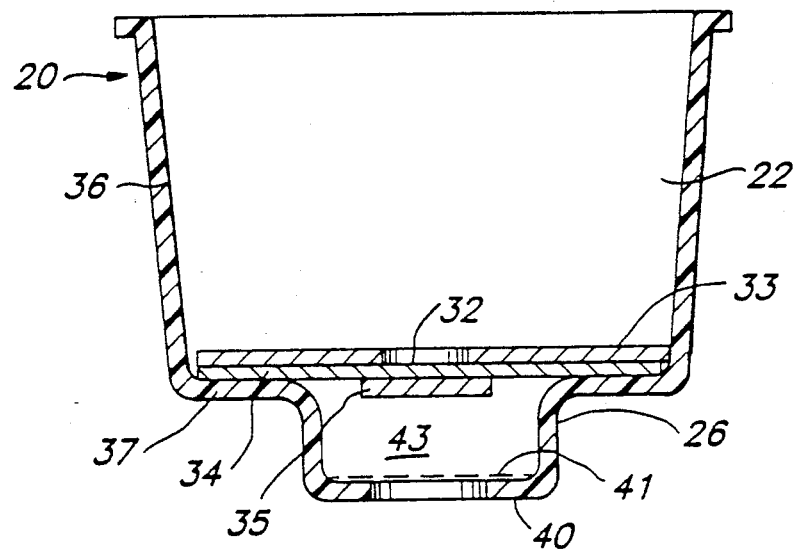
Figure 9B:
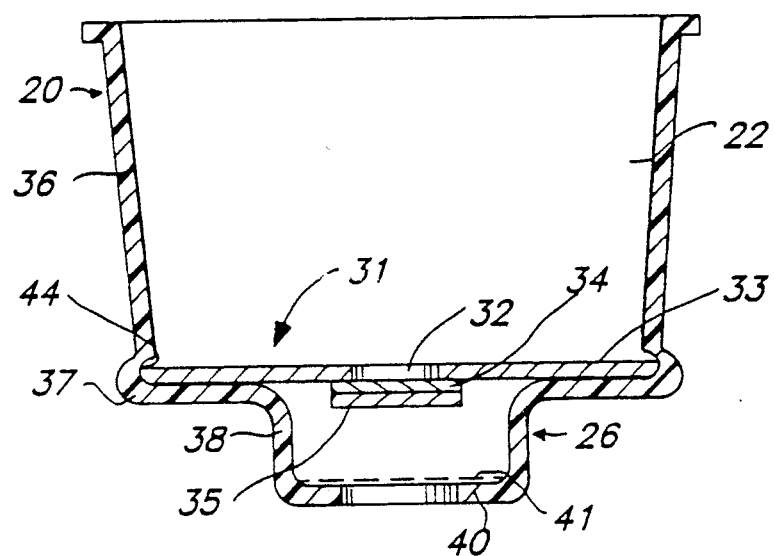

FIG. 9A is a front elevational view, in section, of another embodiment of the coffee maker of the present invention, wherein the partition body and member are secured to the reservoir and body, respectively, by a non-toxic heat sensitive seal applied to the body;

FIG. 9B is a front elevational view, in section, of another embodiment of the coffee maker of the invention, wherein the partition body snap fits into the walls of the reservoir.

Figure 10A:
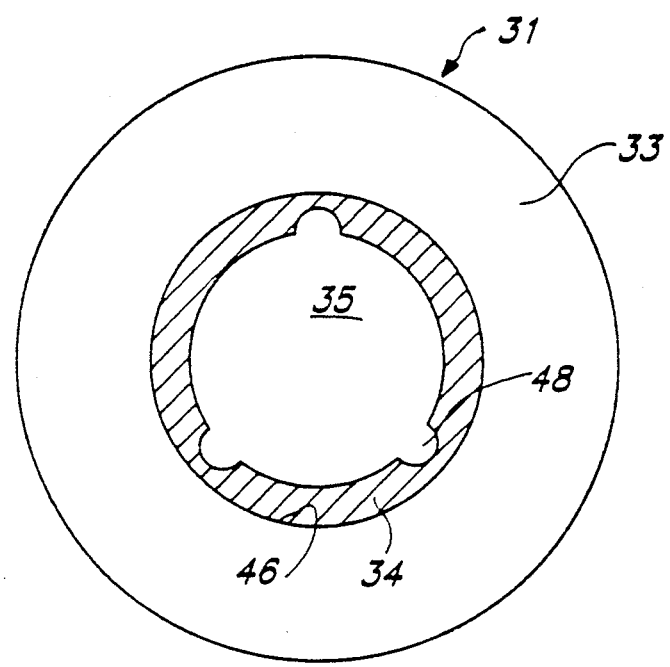
Figure 10B:
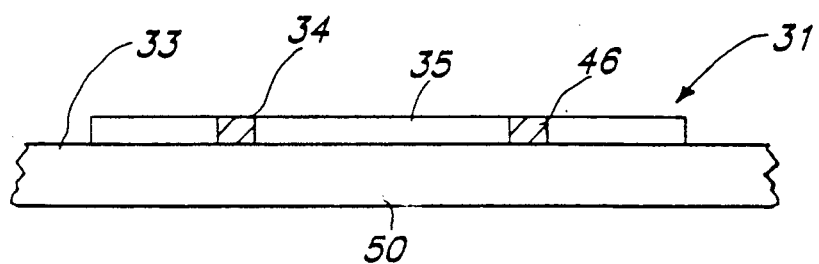

FIG. 10A is a top view of another embodiment of the partition of the coffee maker of the invention, wherein the member has radial tabs to centrally position it in the center of the aperture in the partition body, and the non-toxic heat sensitive seal fills the space between the member and body to releasably secure the member thereto;

FIG. 10B is a side elevational view of the partition of FIG. 10A on a conveyor used in assembling the body, member and non-toxic heat sensitive seal.

Figure 11A:
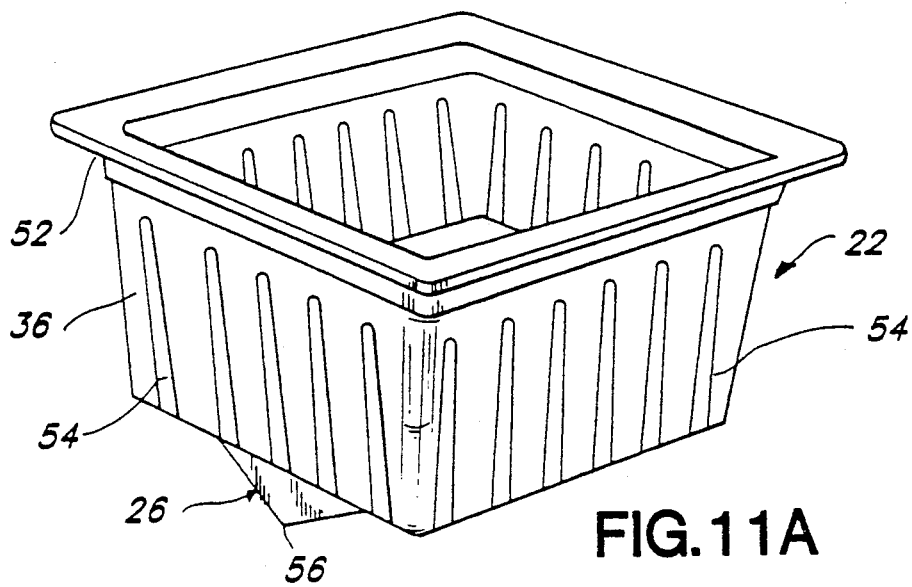
Figure 11B:
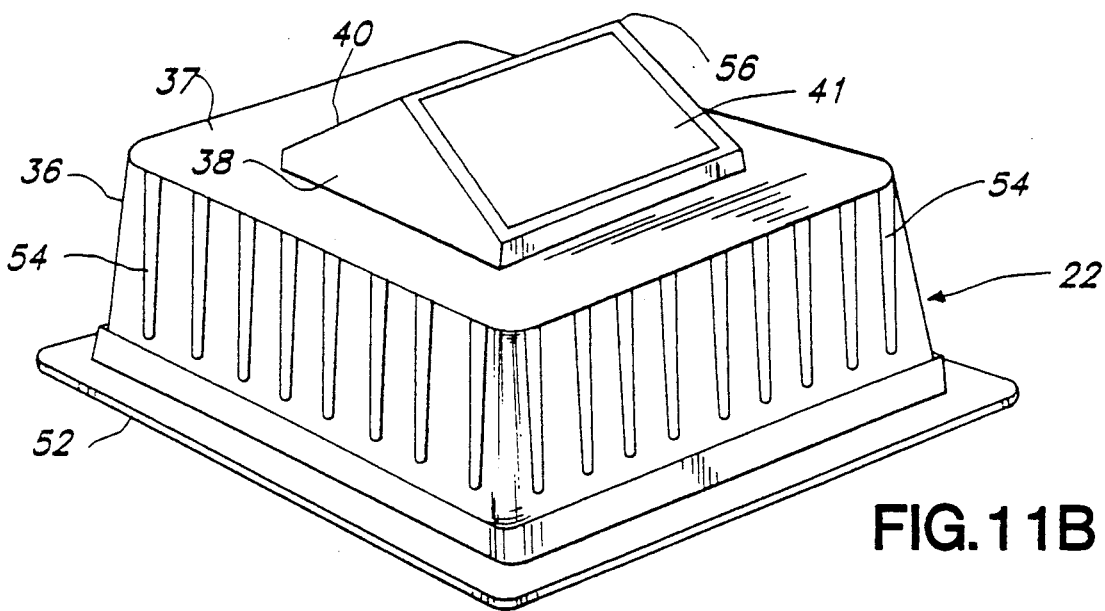
Figure 11C:
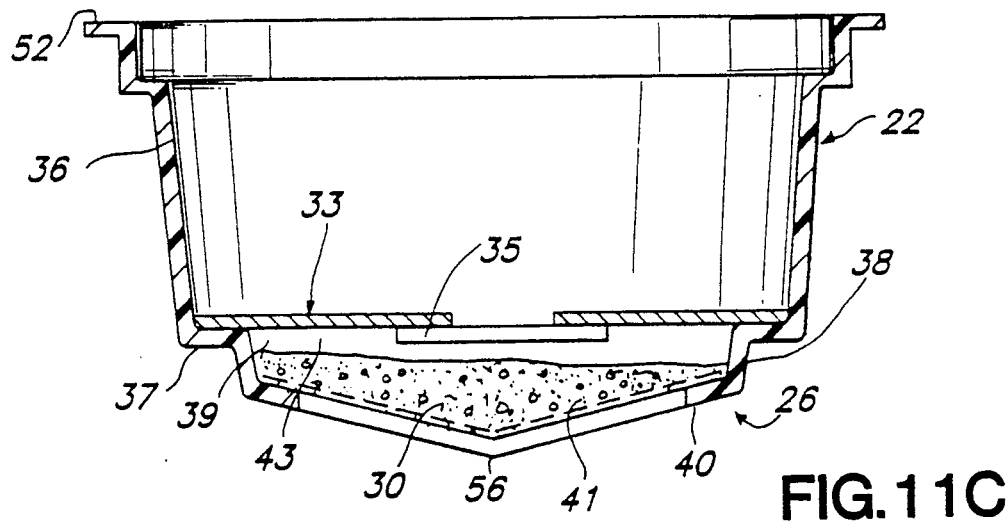
Figure 17:
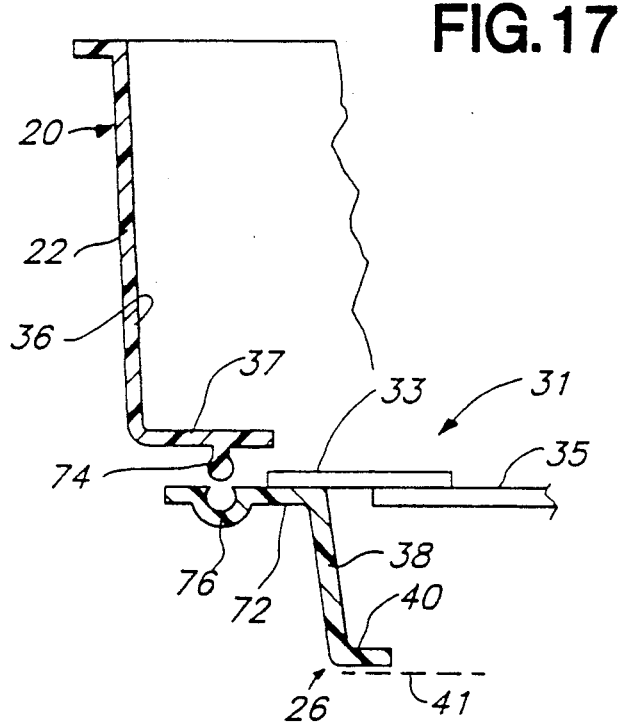
Figure 18:
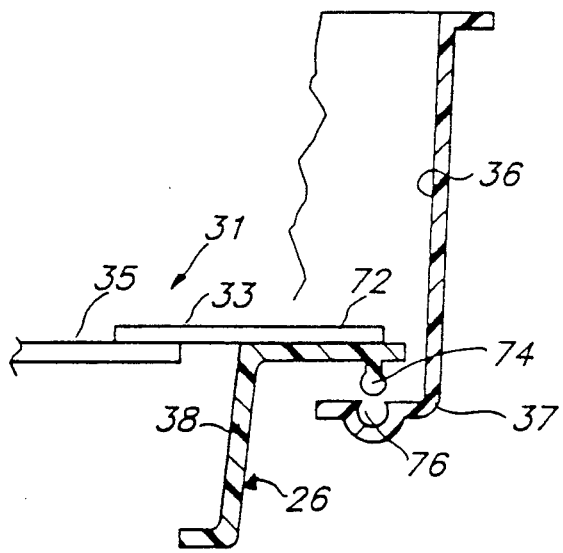
Figure 19:
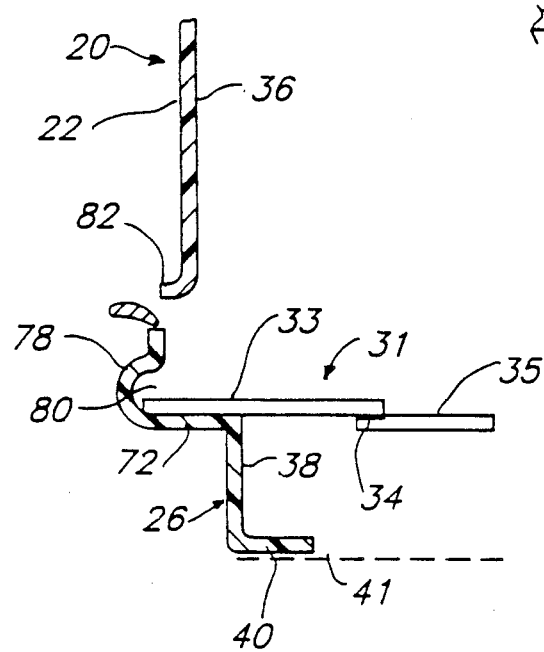

FIG. 11A is an orthogonal view of still another embodiment of a coffee maker of the present invention looking into the top of a square-shaped reservoir;

FIG. 11B is the coffee maker of FIG. 11A looking at the cone shaped filter element of the coffee maker;

FIG. 11C is a front elevational view, in section, of the coffee maker shown in FIGS. 11A and 11B;

FIGS. 12-16 are front elevational views, in section, of other embodiments of the coffee maker of the invention;

FIGS. 17-19 are front elevational views of portions of other embodiments of the coffee maker of the invention, wherein the coffee filter elements and reservoir snap together.

Figure 20:
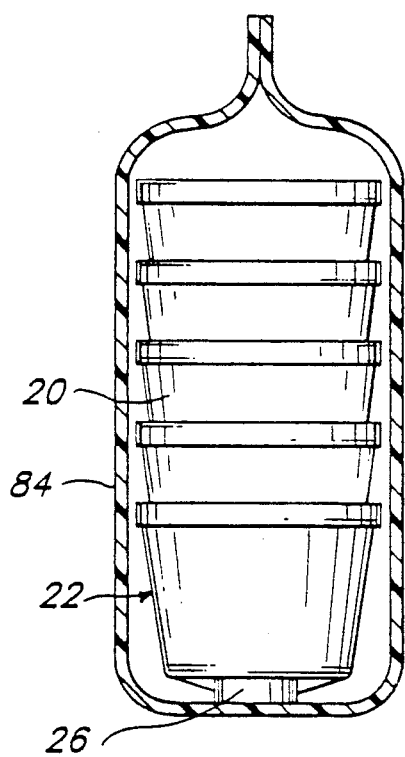
Figure 21:
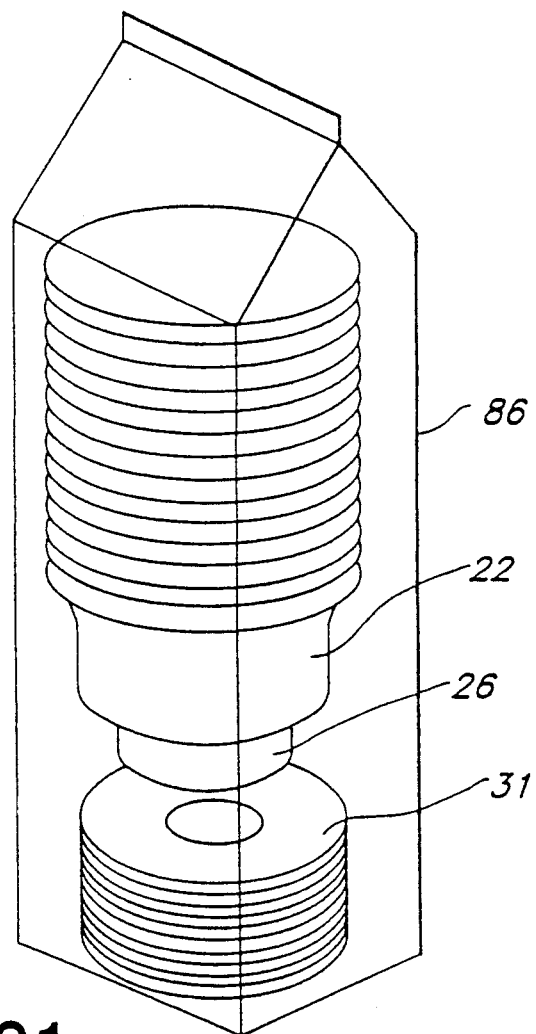

FIG. 20 is an illustration of a freshness package for the coffee maker of the present invention, wherein premeasured amounts of coffee are in the sealed coffee filter elements;

FIG. 21 is an illustration of a package for the partitions and containers of the coffee makers of the invention, wherein the coffee filter elements can be filled by the consumer;

FIGS. 22 and 23 are illustrations of separate packages for the reservoirs (FIG. 22) and the coffee elements (FIG. 23) of the coffee makers of the present invention, wherein the package of FIG. 23 is a freshness package; and FIG. 24 is an illustration of a freshness package for several coffee filter elements and a reservoir of the coffee maker of the present invention.

Referring to the drawings and first to FIG. 1, there is shown a single cup microwave drip-type coffee maker 10 embodying the invention. The coffee maker 10 is positioned in a cavity 12 of a conventional microwave oven 14. A coffee receptacle 16 is situated below the coffee maker 10 for receiving the freshly brewed coffee. Microwave energy is provided to the cavity 12 by a magnatron (not shown). The duration of the microwave energy is controlled by a timer 18. Other conventional microwave features are not shown and described as they are well known in the art and are not part of the present invention.

Referring now to FIG. 2, the coffee maker 10 comprises a container 20 having two compartments, an upper reservoir 22 for holding water 24, and a lower filter element 26 for holding coffee grounds 30 and providing sufficient space for the expansion of coffee grounds upon contact by water 24 from the reservoir 22. A partition 31 separates the upper reservoir 22 from the lower coffee filter element 26. The partition 31 includes a body 33 having a central aperture or opening 32, a member 35 positioned above and over the aperture 32, and a heat responsive non-toxic seal 34 for sealing the aperture 32. The sealing is achieved by adhering the element 35 to the body 33 by the seal 34 until a brewing temperature for the water is reached, e.g. about 130° F. to about 220° F. (54° C. to 100° C.), at which time the member 35 is released from the body 33 and opens the aperture 32. By virtue of the relative breadth or size of the reservoir 22 and of the aperture 32, the heated water flows from the larger reservoir 22 through the smaller aperture 32 and into the coffee filter element 26 in a restricted manner.

The upper compartment or reservoir 22 is open at the top, has generally cylindrical side walls 36 and a bottom wall 37 which can include the partition 31. The walls 36 and 37 preferably are made of a microwave permeable material, such as polypropylene, polyethylene, foamed styrene and polyurethane coated paper board. In the illustrative embodiment the bottom wall 37 is in the form of an annular shoulder and includes a relatively large central opening 39.

As illustrated in FIG. 2, the partition 31 is positioned on the bottom wall or shoulder 37 and extends across the opening 39. In a preferred embodiment of the coffee maker 10, the body 33 is an annular ring which can be heat sealed to the bottom wall 37. The illustrative ring 33 is composed of a relatively stiff, water tight material to keep the water in the reservoir portion of the coffee maker until the water is heated to the temperature at which coffee brews The ring 33 also is capable of and does support the member 35 covering the sealed central aperture 32 to prevent the premature flow of water from the reservoir 22 into the coffee filter element 26.

The illustrative member 35 of the preferred embodiment of the invention is the form of a disk composed of a relatively stiff, floatable, water tight material. The disk 35 has a breadth or diameter which is greater than the breadth or diameter of the central aperture 32 so that the peripheral portion of the disk 35 extends over the portion of the ring 33 about and adjacent to the aperture 32. Illustrative of the materials for the disk 35 are plastic foams, including polyethylene foam, polystyrene foam, polycarbonate foam, polyurethane foam. or any food safe material with a bulk density less than about 0.5 gm/cc with a closed cell structure.

The heat responsive non-toxic seal 34 is positioned between the ring 33 and the disk 35 and secures the disk 35 to the ring 33 over the aperture 32 to close or seal the aperture 32 until a brewing temperature is reached. The seal 34 can be deposited on the disk 35 or on the ring 33, or on both the disk 35 and ring 33 prior to closing the aperture 32. As shown in FIGS. 5A and 5B, the seal 34 is applied to the lower surface of the disk 35 in the form of a layer (FIG. 5A) and the disk 35 is adherently secured to the upper surface of the ring portion about the aperture 32 (FIG. 5B) by pressing (with or without heat) the disk 35 against the ring 33 to close and seal the aperture 32.

The seal 34 comprises a heat responsive substance which melts, dissolves, etc. upon reaching the desired temperature, i.e., a brewing temperature, and thereby cause the disk 35 to separate and float upwardly from the ring 33 as illustrated in FIG. 4. The thermally responsive substance of the seal 34 includes non-toxic waxes, such as natural and synthetic waxes including beeswax, paraffin, carnauba, polyethylene, high density polyethylene glycol, e.g. CARBOWAX and other non-toxic plastic materials. In addition, the non-toxic seal can include rice paper, chocolate or other flavored substances, hydrogenated oil or fruit pulp which melt, dissolve or the like at desired coffee brewing temperatures and which may impart a desired flavor to the coffee.

The lower compartment of filter element 26 includes integral side walls 38 which extend downwardly from the bottom wall or shoulder 37 of the reservoir 22. As shown, the filter element 26 is tubular with the partition 31 across and above its upper end. At the lower end of the coffee filter element 26 is an annular shoulder or open bottom wall 40 extending inwardly from the wall 38 for securing a filter 41 thereon and through which the brewed coffee is filtered. The filter 41 preferably is made from conventional filter paper for coffee which is adhesively secured or heat sealed to the annular shoulder 40, and the filter 41 further serves to trap or retain thermally responsive substance which has passed through the coffee grounds 30. As illustrated in FIG. 2, the partition 31 and filter element 26 provide a chamber 43 with sufficient volume for holding the dry coffee grounds and for allowing the expansion of the coffee grounds during brewing without binding or compacting thereof. By so doing, the expanded coffee grounds do not inhibit the flow of water therethrough.

The coffee maker 10 also can include means for positioning or resting the coffee maker 10 above or on the receptacle 16. As shown in FIG. 4, the coffee maker 10 includes a larger upper reservoir 22 having a bottom wall 37 which rests on the mug 16 while the smaller filter element 26 depends from the wall 37 into the mug 16.

In manufacture, the coffee maker 10 can be formed by conventional techniques, such as molding or thermoforming. Thereafter, the required amount of coffee can be pre-measured and placed in the chamber 43 of the coffee filter element 26 and the filter 41 added. If desired, the coffee does not have to be placed in the chamber 43 at the point of manufacture but can be added at any time prior to use. In such instance, the filter element 26 can be of a removable type or it can be separately provided.

In an illustrative embodiment of the coffee maker 10 of FIGS. 2-5B the reservoir 22 is molded from polypropylene, has a breadth or diameter of about 4.0 inches and has a capacity of about 9.0 ounces. The partition body 31 is made from SBS 18 point (about 0.002 inches thick) board and is coated with EVA (eyhylene vinyl acetate) having a thickness of about 1.0 mil (0.001 inches) for heat sealing the partition 31 in the reservoir 22, and the disk 35 can be made from plastic foam materials, such as polyurethane foam. The partition body 33 has a breadth or diameter of about 3.50 inches and the aperture 32 has a breadth of about 0.75 inches, and the disk 35 has a breadth or diameter of about 1.0 inches. The non-toxic heat responsive seal 34 is formed from beeswax and has a thickness of about 0.001 inches.

In the illustrative embodiment of the seal 34 of FIGS. 5A-5B, the seal 34 is applied as a flat layer across the disk 35. In the embodiment shown in FIGS. 6A and 6B, the seal 34 is applied to the disk 35 (FIG. 6A) in a sinusoidal manner to provide a "tread"-like pattern which can enhance the integrity of the applied seal 34 because the upper portions of the seal 34 are allowed to flow into the depressions therebetween.

In FIGS. 7A-7C the seal 34 is applied to the disk 34 in the form of an annular bead (e.g. FIG. 7C) about the disk portion which will overlie the upper surface of the partition body 33 about the aperture 32 when the disk 34 is applied to the body 34 to close the aperture 32.

In using the illustrative coffee maker 10 to brew a cup of fresh drip-type coffee in a microwave oven, the reservoir 22 is filled with water, the filled coffee maker is positioned on a cup 16 or the like and the assembly is placed in the microwave oven 14. The microwave oven 14 is set for a predetermined time on the timer 18 It has been found that in a 700 watt microwave oven, one cup (9 ounces) of tap water will reach 200° F. in about 2.0 minutes. As the water reaches the brewing temperature, e.g. 200° F., the heat responsive seal 34 melts, dissolves or the like to release the disk 35 from the ring 33, whereupon the disk 35 floats upwardly in the reservoir 22 as shown in FIG. 4. In doing so, the aperature 32 is opened allowing the heated water to flow out of the reservoir 22 through the aperture 32 and into the coffee grounds 30 in the filter element 26. There the heated water 24 dissolves a portion of the coffee grounds 30 to produce freshly brewed coffee. Portions of the thermally responsive substance 34 may be retained either in the coffee grounds 30 or the filter 41. During this stage of the process, the microwave oven 12 can be turned off and the freshly brewed coffee continues to flow through the filter 41 and into the receptacle 16 below. The dripping process takes about two minutes. At this point, the assembly is removed from the microwave oven 12, and the coffee maker 10 removed from the cup or the like and the coffee is ready for drinking.

Referring now to the other drawings and first to FIGS. 8A and 8B, there is shown a coffee maker 10, including a partition 31 adapted to float upwardly in the reservoir 22 when the water 24 reaches a brewing temperature. In this embodiment the partition 31 comprises a floatable water-tight material, such as a plastic foam, positioned above and over the reservoir wall 37 and opening 39 and sealed to the bottom wall 37 by the non-toxic heat responsive seal 34 of the invention. As illustrated the seal 34 is applied in an annular ring between the partition 31 and the bottom wall 37 for releasably securing the partition 31 to the wall 37. As shown in FIG. 8B, when the water reaches a brewing temperature the seal 34 melts, dissolves or the like, and the partition 31 floats upwardly in the reservoir 22 as the water flows from the reservoir 22 through the opening 39 into the coffee filter element 26 for brewing and dispensing as previously described.

In FIGS. 9A and 9B, still further coffee makers 10 of the present invention are shown. In FIG. 9A the heat responsive seal 34 extends across the underside of the partition body 33 and secures the partition body 33 to the bottom wall 37 and the disk 35 to the underside of the partition body 33 to close and seal the aperture 32. In FIG. 9B the partition 31 is snap fitted into an annular groove 44 in the lower portion of the sidewalls 36 of the reservoir 22. In this embodiment, the seal 34 is applied to the upper surface of the disk 35 which is then releasably secured to the underside of the partition body 33 by the seal 34 to close and seal the aperture 32. In this embodiment, moreover, the filter 41 is positioned within the coffee filter element 26 and adhesively secured to the upper surface of the bottom wall 40.

In using the coffee makers 10 of in FIGS. 9A and 9B the procedure previously described can be followed. In these embodiments, when the water in the reservoirs 22 reaches a brewing temperature the heat seals 34 melt, dissolve or the like releasing the disks 35 from the partition bodies 33, whereupon the disks 35 will drop into the coffee filter elements 26 to thereby open the apertures 32 water for brewing coffee.

In the embodiment of the invention shown in FIG. 10A, the coffee maker 10 includes a partition 31 having a body 33 with a central aperture 32, a disk 35 positioned within the aperture 32 and a heat responsive seal 34 in the aperture 32 and annular space 46 between the disk 35 and body 33, to releasably secure the disk 35 in the aperture 32 and seal the aperture 32 closed until a desired brewing temperature is reached. In this embodiment, the disk 35 also includes tabs 48 spaced about and extending laterally from the disk 35 to properly position the disk 35 within the aperture 32 and provide the desired annular space 46.

The partition 31 of this embodiment can be formed with the assistance of a conveyer 50 which can be heated. The partition body 33 and disk 35 can be deposited on the conveyer 50 with the tabs 48 properly positioning the disk 35 in the aperture 32. A non-toxic heat responsive substance 34 (e.g. beeswax) can be placed in the space 46 and heated by the conveyer 50 to melt and releasably secure the disk 35 to the body 33 within the aperture 32. The partition 31 with a cooled solid seal 34 can then be removed from the conveyer 50 and inserted into the reservoir 22 of a coffee make 10 of the invention.

In the embodiment of the invention shown in FIGS. 11A-11C, there is illustrated a reservoir 22 having a generally rectilinear cross sectional shape to increase the capacity of the coffee maker 10 over a generally cylindrically shaped coffee maker. In the illustrative embodiment, the reservoir 22 is of a square shape, and includes a lip 52 extending laterally from and about the upper end of the reservoir walls 36 to facilitate pouring of water and movement of the coffee maker 10 without spilling. The reservoir 22 also includes vertical ribs 54 for strengthening the walls 36.

The partition 31 for this embodiment of the invention can be of different configurations. As shown, the partition 31 includes a partition body 33 heat sealed to the bottom wall 37 of the reservoir 22 over the opening 39, and includes a central aperture 32, and a disk 35 releasably secured to the underside of the partition body 33 and over the aperture 32 by the non-toxic heat responsive seal 34 to releasably secure and seal the disk 35 to the aperture 32.

In the illustrative embodiment of FIGS. 11A-11C, the coffee filter element 26 also includes walls 38 having a rectilinear cross-sectional shape and a depending sloping bottom wall 40 to form a generally cone shaped filter element 26 having its vertex 56 in the center thereof. As shown in FIG. 11C the filter 41 is positioned within the cone-shaped bottom wall 40 and is supported thereby. The coffee filter element 26 with the sloping walls 40 enhance the hydraulic dynamics of the water 24 flowing through the coffee filter element 26 for brewing and dispensing therefrom.

Figure 12:
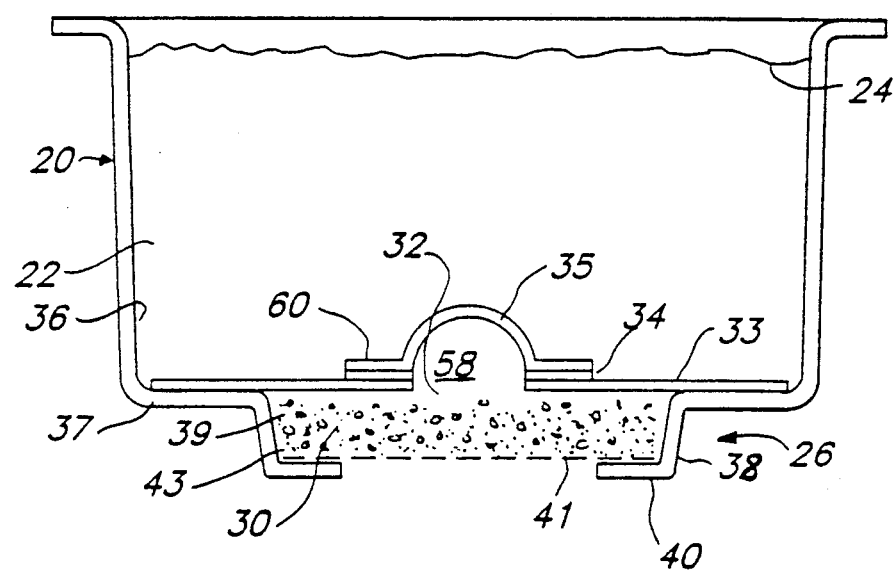

Referring now to FIG. 12, the illustrated coffee maker 10 includes a floatable dome or bell shaped member 35 above and over the aperture 32 in the partition body 33. As illustrated the dome shaped member 35 includes a chamber 58 which is open to the aperture 32 and filter element 26 and is filled with trapped air, and a rim 60 extends about the member 35 for releasably securing the dome 35 to the body 33 by the seal 34 between the rim 60 and the upper surface of the partition body 33. In use when the water in the reservoir 22 reaches a brewing temperature, the seal 34 melts, dissolves or the like thereby releasing the dome 35 from the partition body 33, whereupon the trapped air within the dome chamber 58 will increase the rate of the upward movement of-the dome 35 as it floats upwardly in the reservoir 22, to thereby facilitate the flowing of heated water through the aperture 32 into the coffee filter element for brewing and dispensing.

Figure 13:
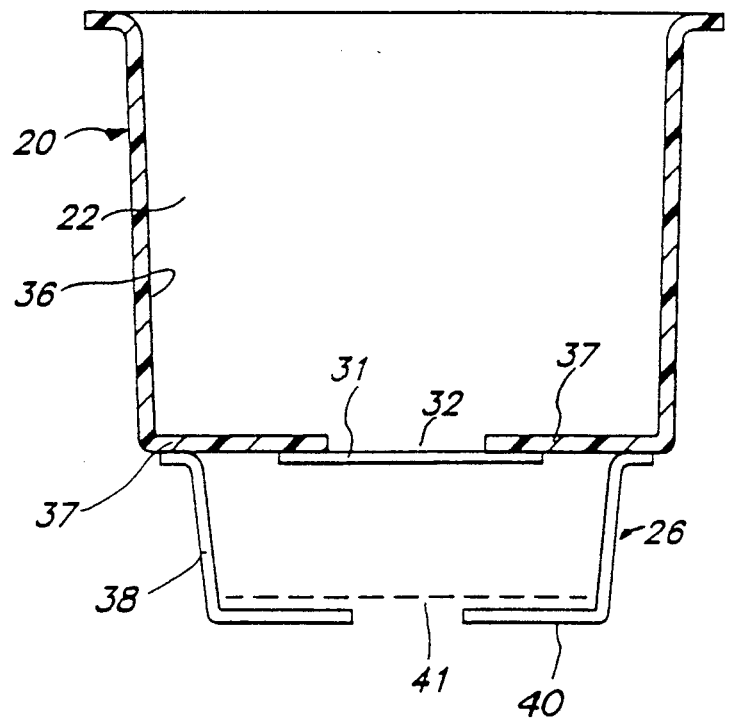
Figure 14:
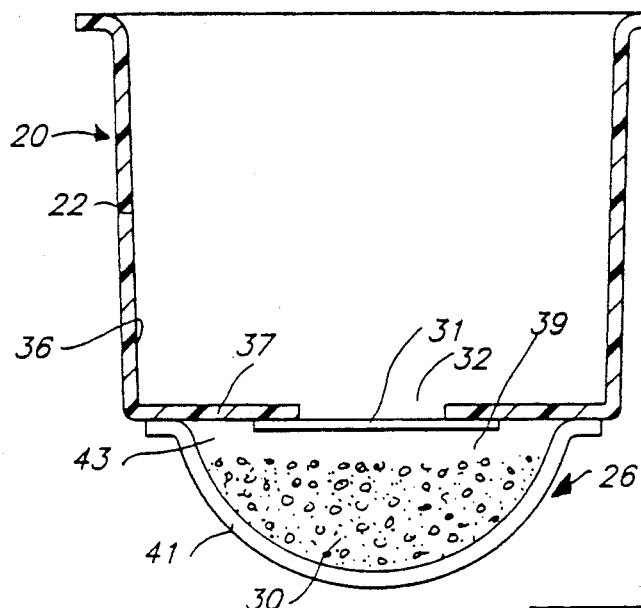

FIGS. 13 and 14 illustrate still other embodiments of the coffee maker 10 of the present invention. In each of the illustrated embodiments the bottom wall 37 of the reservoir 22 extends inwardly to form the aperture 32 and the partitions 31 are of a unitary structure positioned over the apertures 32 and releasably sealed to the bottom walls 37 by the non-toxic heat responsive seals 34 between the partitions 31 and the adjacent portions of the walls 37. In these embodiments, moreover, the coffee filter elements 26 can be independent and not integrally formed with the reservoir 22. The illustrated coffee filter elements 26 can be separately formed and heat sealed or otherwise secured to the bottom walls 37 of the reservoirs 22. In the embodiment illustrated in FIG. 14, the coffee filter element 26 is filter paper in the form of a pouch without structural walls 38 and 40 of the previously illustrated embodiments of the coffee filter elements 26.

In FIGS. 15-19 the illustrated coffee makers 10 of the invention include coffee filter elements 26 which are separable from the reservoir 22. In these embodiments the user or other person can add the coffee grounds to the filter elements 26 and then secure the filter elements 26 to the reservoirs 22 for brewing and dispensing coffee. Generally the reservoir 22 and elements 26 include coacting means for securing and separating the components of the coffee makers 10.

Figure 15:
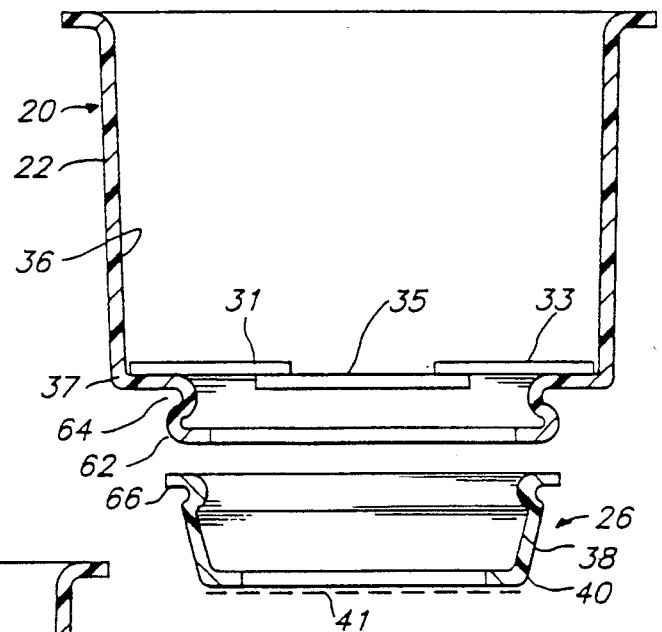

In FIG. 15, the coffee maker 10 includes a first part comprising the reservoir 22. The reservoir 22 has cylindrical side walls 36 and a bottom wall 37. Secured to the bottom wall 37 is a partition 31 of the invention. Depending from the bottom wall 37 of the reservoir 22 is a generally open member 62 onto which the coffee filter element 26 is adapted to securely snap in place. As shown, the member 62 is cylindrical in shape and has an outer annular groove 64 adjacent the bottom wall 37 for securing the filter element 26 to the reservoir 22.

The coffee filter element 26 forms the second part of the illustrative coffee maker 10. The element 26 has cylindrical side walls 38, and includes an inwardly extending annular protuberance 66 at the upper end thereof adapted to snap into the groove 64 in the member 62. The coffee filter element 26 is open at its top to allow the consumer (or other person or machine) to fill the element with coffee grounds 30 according to personal preference prior to assembly.

In operation, the consumer can fill the chamber 43 of the filter element 26 with a coffee of choice, and the filled coffee filter element 26 is snapped into place at the bottom of the reservoir 22 by means of the mating protuberance 66 and groove 64. The reservoir 22 can then be filled with water, placed over or on a receptacle 16 and the entire assembly 20 can be placed in the microwave oven.

Figure 16:
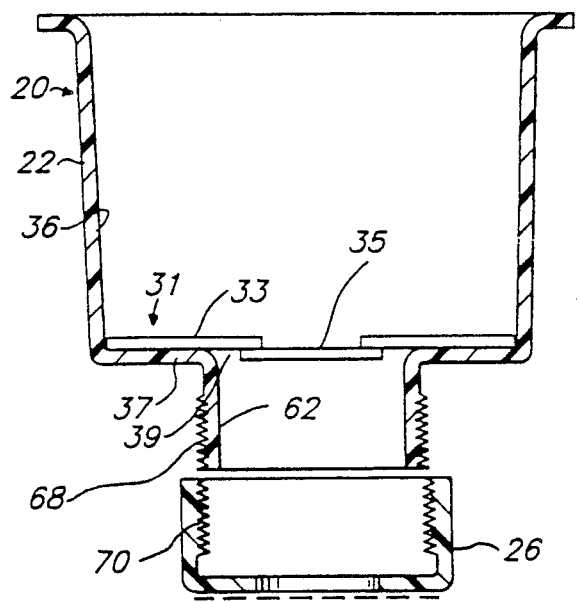

In FIG. 16 the coacting means include complementary threads for separating and securing the element 26 to and from the reservoir 22. As illustrated the reservoir member 62 includes external threads 68 and the filter element 26 includes internal complementary threads 70.

FIGS. 17 and 18 illustrate additional embodiments of the coffee makers 10 of the present invention, wherein the coffee filter elements 26 are separable from the reservoirs 22. In these embodiments the coffee filter elements 26 include rims 72 extending laterally from the upper end of the side walls 38 of the filter elements 26 and are positioned in an overlying or underlying relationship to the bottom walls 37 of the reservoirs 22.

In FIG. 17, the bottom wall 37 includes a depending detent 74 which can be snap fitted into a groove 76 in the underlying rim 72, and in FIG. 18 the overlying rim includes a depending detent 74 which can be snap fitted into a groove 76 in the underlying bottom wall 37 of the reservoir 22.

FIG. 19 illustrates a still further embodiment of a two part coffee maker 10 of the present invention. In this embodiment the coffee filter 26 includes a partition 31 on the rim 72 and a curl 78 which extends upwardly from the rim 72 and forms a groove 80 adjacent the partition 31. In this instance, the walls 36 of the reservoir 22 include a foot 82 which extends outwardly from the lower end thereof and which is adapted to interlock in the groove 80 of the curl 78 to secure the reservoir 22, partition 31 and filter element 26 together.

While a single cup coffee maker is shown in the illustrative embodiments, it is to be understood that larger coffee makers with a correspondingly larger receptacle may be employed. These embodiments of the invention can provide more than one cup of freshly brewed coffee in receptacles from which individual cups of coffee can be poured.

Also, to preserve the freshness of the coffee grounds in assembled coffee makers 10 or separable coffee filter elements 26 freshness containers or bags can be used, or the filter elements 26 can include removeable freshness seals, or both measures can be utilized to maintain the freshness of the coffee grounds.

FIG. 20 illustrates a freshness container or bag 84 for packaging coffee makers 10 with premeasured amounts of coffee grounds in the filter elements 26 in a nesting fashion and the bag 84 is sealed until a coffee maker 10 is needed.

FIG. 21 illustrates a package for containers 86 and partition 31, wherein the consumer is going to fill the filter elements 26, with coffee grounds and then secure the partitions in place.

FIGS. 22 and 23 are illustrative of packaging the reservoirs 22 and filter elements 26 separately, wherein the filter elements 26 are prefilled with coffee grounds and packaged in a freshness package 88 which keeps the coffee grounds fresh until a filter element 26 and reservoir 22 packaged in a box 90 are assembled.

FIG. 24 illustrates a freshness package 92 for a reusable reservoir 22 with several prefilled filtered elements 26, wherein the elements 26 are housed within the reservoir 22 for compactness.

The coffee grounds for the coffee filter elements, preferably are in the form of flakes. It has been found flakes improve the extraction rate of the brewed coffee from the grounds. The greater the extraction rate, the shorter the time it will take for the coffee to be brewed. In the preferred embodiment of the coffee, the coffee beans are first ground into grounds and then formed into flakes by passing the grounds between rollers. Having the coffee in the form of flakes provides a high surface area to volume ratio which ratio increases the extraction rate. Illustratively using the flakes in the coffee filter elements of the coffee makers of the invention yields a brewing time of approximately two minutes for a cup of coffee. As used herein coffee grounds includes coffee in the form of grounds and flakes.

The invention in its broader aspects is not limited to the specific described embodiment and departures may be made therefrom within the scope of the accompanying claims without departing from the principles of the invention and without sacrificing its chief advantages.

What is claimed:

1. A drip-type coffee maker adapted to discharge freshly brewed coffee, comprising:
    a reservoir for holding water to be heated to a temperature for brewing coffee,
    a coffee filter element adapted to hold coffee grounds and to receive the heated water from said reservoir and dispense freshly brewed coffee therefrom, and
    a partition between said reservoir and coffee filter element, including a body having at least one aperture therein, a member adapted to cover said aperture, and a non-toxic heat responsive sealing substance adapted to releasably secure said member to said partition body to seal said aperture closed until water in said reservoir reaches a temperature for brewing coffee, whereupon said heat responsive substance is adapted to release said member and thereby open said aperture to allow the flow of heated water from said reservoir into said filter element and the coffee grounds to become freshly brewed coffee ready for dispensing from the coffee maker.

2. The coffee maker of claim 1, wherein said partition body is floatable and adapted to be releasably sealed in said reservoir by said non-toxic heat responsive sealing substance until the water in said reservoir reaches a temperature for brewing coffee, whereupon said heat responsive substance is adapted to release and allow said partition body to float upwardly at which time the heated water from said reservoir will flow into said filter element and the coffee grounds to become freshly brewed coffee ready for dispensing.

3. The coffee maker of claim 2, wherein said partition portion has a closed cell structure and a bulk density of less than about 0.05 gm/cc.

4. A drip-type coffee maker adapted to discharge freshly brewed coffee, comprising:
    a reservoir for holding water to be heated to a temperature for brewing coffee,
    a coffee filter element adapted to hold coffee grounds and to receive the heated water from said reservoir and dispense freshly brewed coffee therefrom, and
    a partition between said reservoir and coffee filter element, wherein said partition is floatable and is adapted to close and open communication between said reservoir and coffee filter element, and a non-toxic heat responsive sealing substance adapted to releasably seal said partition in the closed position within the coffee maker until water in said reservoir reaches a temperature for brewing coffee, whereupon said heat responsive substance is adapted to release said partition from its closed position between said reservoir and filter element and said partition floats upwardly to thereby open said reservoir to said coffee filter element to allow the flow of heated water from said reservoir into said filter element and the coffee grounds to become freshly brewed coffee ready for dispensing from the coffee maker.

5. The coffee maker of claims 1 and 4 comprising materials adapted for use in a microwave oven.

6. The coffee maker of claim 5 further comprising means thereon for positioning the coffee maker on a receptacle, and wherein said coffee maker is adapted to dispense the freshly brewed coffee into a receptacle therebelow while in the microwave oven.

7. A disposable drip-type coffee maker for use in a microwave device adapted to produce freshly brewed coffee, comprising:
a reservoir adapted to hold water to be heated by the microwave device, including an opening in the top of said reservoir for receiving the water and microwave permeable peripheral walls,
a coffee filter element connected to the lower end of said reservoir adapted to hold coffee therein and including a filter at its lower end for filtering brewed coffee therethrough, and
a partition between said reservoir and said coffee filter element, including a body having at least one aperture therein, a member adapted to cover said aperture, and a non-toxic heat responsive sealing substance adapted to releasably secure said member to said partition body and covering said aperture to seal said aperture closed until the water in said reservoir is heated to a temperature for brewing coffee by the microwave device, whereupon said heat responsive sealing substance is adapted to release said member and thereby open said aperture to the heated water which will flow through the aperture into said filter element and the coffee grounds to become freshly brewed coffee.

8. The coffee maker of claims 1 or 3, wherein said member is floatable and is releasably secured to the upper surface of said partition by said non-toxic heat responsive sealing substance, and wherein upon release said member floats upwardly in said reservoir, thereby allowing water to flow from said reservoir through said aperture into said coffee filter element.

9. The coffee maker of claim 8, wherein said member has a closed cell structure and a bulk density of less than about 0.5 gm/cc.

10. The coffee maker of claims 1 or 7, wherein said member is dome shaped and floatable having an inner chamber for trapping air therein and adapted to cover said aperture, and said non-toxic heat responsive sealing substance is adapted to releasably secure said member to the upper surface of said body with said inner chamber open to said aperture to thereby seal said aperture until water in said reservoir reaches a temperature for brewing coffee, whereupon said heat responsive sealing substance is adapted to release said member which floats upwardly in said reservoir at a relatively rapid rate due to trapped air therewithin.

11. The coffee maker of claims 1, 4 or 7, wherein said coffee maker further comprises coacting means on said reservoir and coffee filter elements for separating and securing said reservoir and coffee filter from and to one another.

12. The coffee maker of claim 11, wherein said coacting means comprises an annular groove on said reservoir and an extending annular proturbance on said coffee filter element which mates with said extending annular groove on said reservoir so that said reservoir and said coffee filter element can be snapped together and secured to one another.

13. The coffee maker of claim 11, wherein said coacting means comprises an extending annular proturbance on said reservoir and an annular groove on said coffee filter element which mates with said extending annular proturbance on said reservoir so that said reservoir and said coffee filter element can be snapped together and secured to one another.

14. The coffee maker of claim 11, wherein said coacting means comprises complementary and mating threads on said reservoir and on said coffee filter element for releaseably securing said coffee filter element to said reservoir.

15. The coffee maker of claim 11, wherein said coacting means comprises a detent on said reservoir and a groove in said coffee filter element which mates with said detent on said reservoir so that said reservoir and said coffee filter element can be snapped together and secured to one another.

16. The coffee maker of claim 11, wherein said coacting means comprises a groove in said reservoir and a detent on said coffee filter element which mates with said groove in said reservoir so that said reservoir and said coffee filter element can be snapped together and secured to one another.

17. The coffee maker of claim 11, wherein said coacting means comprises an outwardly extending foot from said reservoir and a curl on said coffee filter element which mates with said outwardly extending foot on said reservoir so that said reservoir and said coffee filter element can be snapped together and secured to one another.

18. The coffee maker of claim 11, wherein said coacting means comprises a curl on said reservoir and an outwardly extending foot on said coffee filter element which mates with said curl on said reservoir so that said reservoir and said coffee filter element can be snapped together and secured to one another.

19. The coffee maker of claim 11, wherein said filter element is empty prior to use and is adapted to receive coffee at the time of use.

20. The coffee maker of claims 1, 4 or 7, wherein the coffee in said coffee filter element includes coffee grounds in the form of flakes.

21. The coffee maker of claims 1, 4 or 7, wherein said reservoir is rectilinear and said coffee filter element is cone shaped.

22. The coffee maker of claims 1, 4 or 7, wherein at least a portion of said heat responsive sealing substance melts at coffee brewing temperatures.

23. The coffee maker of claims 1, 4 or 7, wherein at least a portion of said heat responsive sealing substance dissolves at coffee brewing temperatures.

24. The coffee maker of claims 1, 4 or 7, wherein said heat responsive sealing substance is selected from the group consisting of natural and synthetic waxes.

25. The coffee maker of claim 24, wherein said heat responsive seal is in the form of an annular bead.

26. The coffee maker of claim 24, wherein said heat responsive seal has a sinusoidal cross sectional configuration.

27. The coffee maker of claims 1, 4 or 7, wherein said coffee filter element is filter paper having an upper peripheral end secured to the bottom of said reservoir.

28. The coffee maker of claims 1, 4 or 7, wherein said reservoir and coffee filter element are separate parts secured together.

29. The coffee maker of claim 28, wherein said coffee filter element is empty prior to use and is adapted to receive coffee at the time of use.

* * * * *